May 11, 1954  D. L. WAUGH  2,677,969
V-BELT
Filed July 14, 1950

INVENTOR.
DALE L. WAUGH
BY
ATT'Y.

Patented May 11, 1954

2,677,969

UNITED STATES PATENT OFFICE 2,677,969

V-BELT

Dale L. Waugh, Dayton, Ohio, assignor to The Dayton Rubber Company, a corporation of Ohio Application July 14, 1950, Serial No. 173,834

5 Claims. (Cl. 74—233)

This invention relates to V-belts and more particularly to wrapped-molded or raw-edged rubber V-belts having greater flexibility and permitting smoother and cooler operation especially when used with pulleys of small diameter.

When conventional V-belts are bent around small pulleys compression waves or similar forces act upon the belts causing uneven operation, undue wear, and excessive internal heating. The compressive forces referred to are particularly noticeable when using wrapped-molded or jacketed belts but also exist in connection with the use of raw-edged belts having a fabric base.

The problems referred to above have been considered by the prior art and one solution has been the formation of cogs or grooves in the bottom of the belt. This solution while providing increased flexibility has had the disadvantage of reducing the contact area and weakening the contact surface, and increasing the final cost of the belt.

It is an object of the present invention to provide a novel belt construction in which the compressive forces produced by operation over pulleys are relieved or reduced while at the same time the effective contact area is not reduced or the contact surface weakened.

An additional object of the present invention is to provide an improved type of belt which operates with greater flexibility and smoothness, and with a low increase in temperature.

In accordance with the present invention it has been found that the foregoing objectives may be obtained by perforating the bottom of the belt by means of openings formed through the base fabric or bottom cover fabric as the case may be, and extending substantially into the compression section. The size and spacing of the openings have been found to be of great importance as has also the depth of penetration of the compression section. The openings referred to are preferably of a circular cross section and should have a diameter of from one eigth to one half the bottom width of the belt. The openings must be spaced longitudinally of the belt and the space between openings should be from two to four times the diameter of the opening. It has also been found that the openings should extend through the base fabric or bottom cover fabric of the belt to at least one half of the depth of the compression section. The openings may be shaped with other curved cross sections besides circular, namely, elliptical or other configurations in which the wall surface is curved. The openings may be formed by drilling, burning, molding, or in any desired manner.

Figure 1:
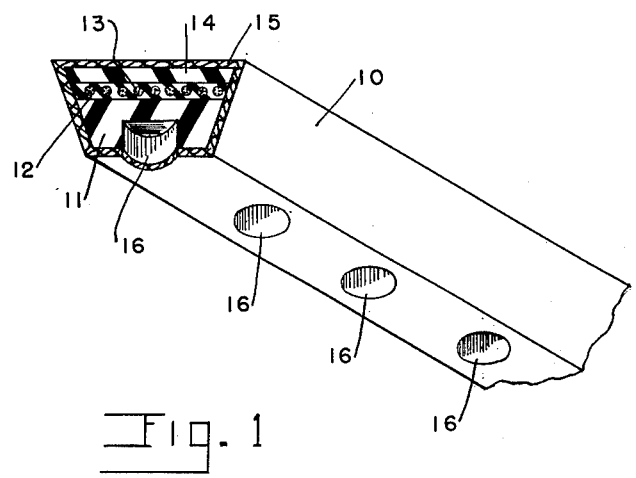

The invention is illustrated in the accompanying drawings in which Figure 1 is a view partially in cross section and partially in elevation illustrating the structure of a typical V-belt of the wrapped-molded type made in accordance with the present invention.

Figure 2:
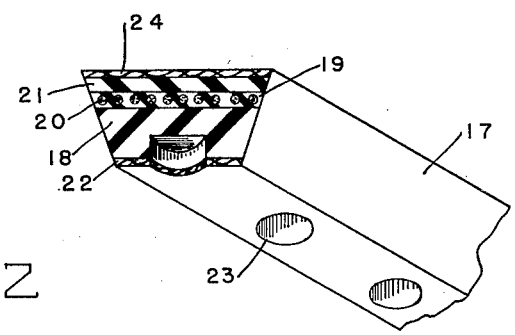

Figure 2 is a view partly in elevation and partly in transverse cross section illustrating the construction of a type of raw-edged belt in accordance with the present invention.

In the drawings:

Figure 1 illustrates belt 10 having compression section 11, neutral axis section 12 reinforced with cords 13, and a tension section 14. The belt is molded with a wrapper 15 around all sides of the belt. After having been molded and cured a series of spaced openings 16 are drilled through the bottom fabric of the belt and into the compression section extending at least half the thickness thereof, but not completely therethrough, as shown.

Figure 2 illustrates a typical raw-edged belt construction in which belt 17 is formed with compression section 18 and neutral axis section 19 having spaced cords 20 embedded therein, and a tension section 21. Fabric layer 22 is formed at the base of the belt and fabric layer 24 is formed at the top surface thereof. After the belt has been manufactured by conventional methods, a series of openings 23 are drilled through the base fabric and into the compression section for a distance at least half the thickness thereof, but not completely therethrough, as shown.

Endless wrapped-molded belts of the V type are generally made by building a cylindrical belt body on a drum from a plurality of superimposed layers to give the desired internal construction. The resulting belt body is then cut into endless cores by means of inclined knives so that the resulting cores have a trapezoidal cross section. The cores are wrapped with rubberized fabric and placed in molds after which the molds are rag wrapped to place the assembled body structure in the mold under compression, after which vulcanization takes place.

Typical methods for building belts by this procedure are described in the patent to Freedlander No. 2,336,084 dated December 7, 1943 and to Kremer et al. No. 2,356,249 dated August 22, 1944.

Raw-edged rubber belts are frequently manufactured in accordance with the methods described by the Freedlander Patents No. 1,611,830 and No. 1,700,999. In these methods a belt sleeve is built upon a drum in a plurality of layers. The sleeve is wrapped and cured under pressure and the vulcanized sleeve is then cut into endless belts having V cross sections. These belts are characterized by the fact that they are not wrapped and possess raw edges and usually are made with fabric top and base layers.

The wrapped-molded belts as well as the raw-edged belts are preferably formed with a bottom compression section, an intermediate neutral axis section, and a top tension section. The tension layer is generally comprised of a plurality of layers of rubberized bias-laid fabric, while the neutral axis section comprises one or more layers of longitudinally extending parallel cords spaced from the adjacent sections by cushioned layers of rubber. The bottom or compression section may comprise rubber alone, or rubber-fiber mixtures commonly known as "Stiflex." In these mixtures the fiber is present uniformly incorporated in minor proportions by weight. The wrapped-molded belts are generally made with an outer cover or wrapping of one or more layers of bias fabric, while the raw-edged belts are formed with a layer of bias fabric at the base of the compression section. It has been found, however, that this bias fabric has a tendency to stiffen the bottom of the belt and thus reduce its flexibility and render it subject to compression forces which occur during movement of the belt around pulleys.

After the belts have been cured, holes of the desired size and spacing as set forth above, are drilled through the base fabric the desired distance into the compression section. In a typical procedure in making a wrapped belt of this type a belt of conventional construction is first made and cured, for example, as described in Patent No. 2,336,084 dated December 7, 1943, granted to A. L. Freedlander. Holes of the proper size and spacing are then drilled through the base fabric of the belt. In the case of raw-edged belts, these may be made by the method described in Freedlander Patent No. 1,591,303 dated December 21, 1926, after which the holes are drilled through the base fabric layer into the compression section.

I claim:

1. A V-type belt of increased flexibility and freedom from compression waves when used around small pulleys, having a fabric base layer, a rubber-containing compression layer, a cord reinforced neutral axis layer, and rubber-containing tension layer, all of said layers being vulcanized together to form an integral unit, openings through the bottom fabric layer extending into but not completely through the compression layer, said openings being spaced longitudinally of the belt and having a diameter from one eighth to one half of the width of the base of the belt and being spaced apart from two to four times the diameter of said openings.

2. A belt according to claim 1 wherein the openings in the compression section are formed to a depth of at least half of the thickness of the compression section.

3. A belt according to claim 2 wherein the belt is formed with raw edges.

4. A belt according to claim 2 wherein the belt is of the wrapped type.

5. A belt according to claim 1 wherein the openings have a cylindrical cross section.

References Cited in the file of this patent

UNITED STATES PATENTS

| Number | Name | Date |
|---|---|---|
| 1,911,496 | Freedlander | May 30, 1933 |
| 2,017,291 | Pfleger | Oct. 15, 1935 |
| 2,054,619 | Freedlander | Sept. 15, 1936 |
| 2,430,024 | Luaces et al. | Nov. 4, 1947 |
| 2,430,500 | Freedlander et al. | Nov. 11, 1947 |